May 11, 1937.　　　R. B. McKINNIS　　　2,080,327
MACHINE FOR TEMPERING OR MOISTENING PRODUCTS
Filed March 26, 1935　　　5 Sheets-Sheet 2

Inventor
Ronald B. McKinnis
Mason & Porter
Attorneys

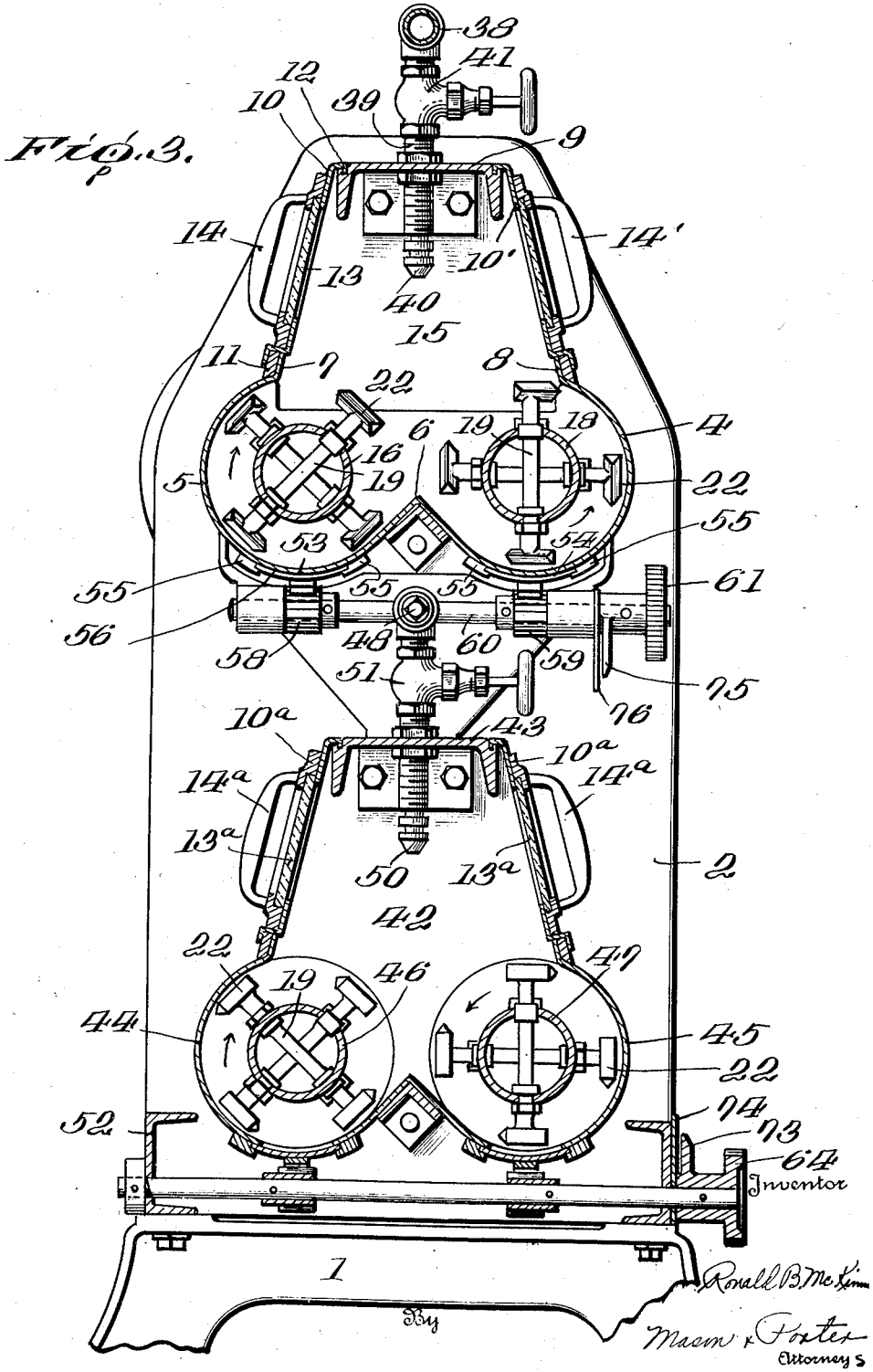

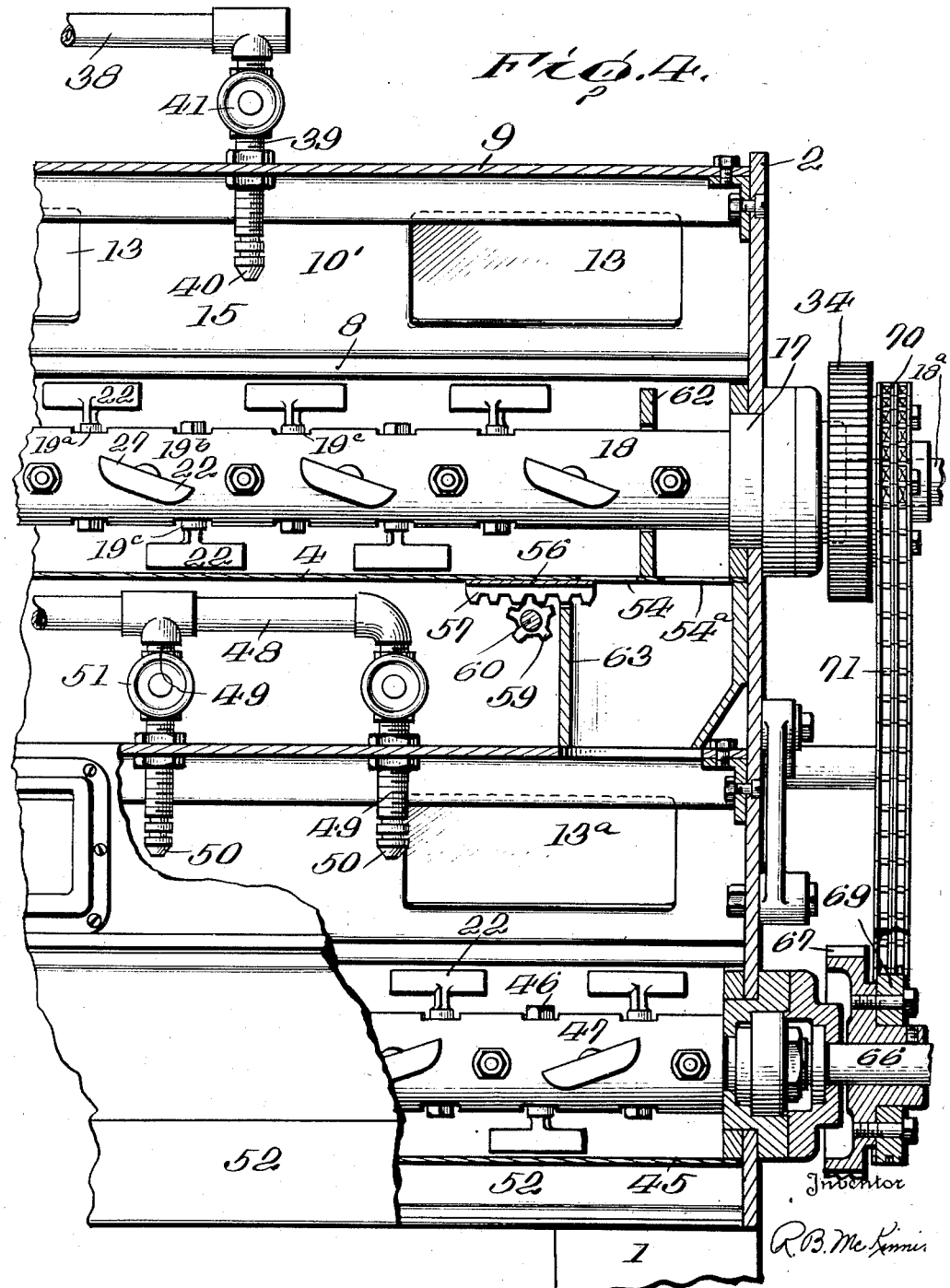

May 11, 1937. R. B. McKINNIS 2,080,327
MACHINE FOR TEMPERING OR MOISTENING PRODUCTS
Filed March 26, 1935 5 Sheets-Sheet 5
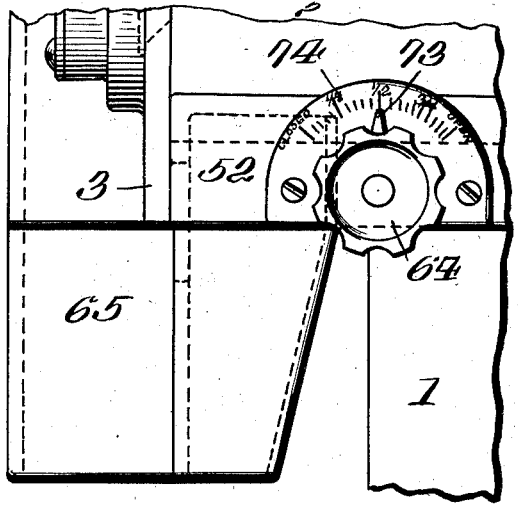
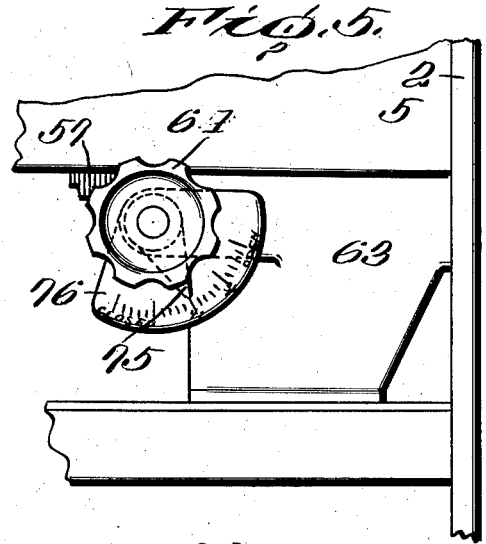
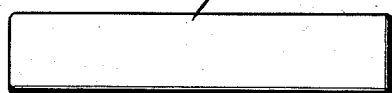
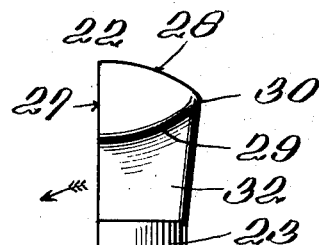
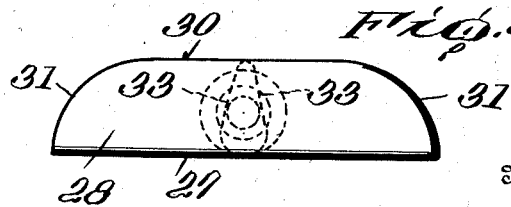
Inventor
Ronald B. McKinnis
By Mason & Porter
Attorneys Patented May 11, 1937

2,080,327

UNITED STATES PATENT OFFICE 2,080,327

MACHINE FOR TEMPERING OR MOISTENING PRODUCTS

Ronald B. McKinnis, Pittsburgh, Pa., assignor to Continental Can Company, Inc., New York, N. Y., a corporation of New York Application March 26, 1935, Serial No. 13,176

14 Claims. (Cl. 259—6)

The invention relates to new and useful improvements in a machine for tempering or moistening products which may be used for forming beverages such as coffee or the like.

An object of the invention is to provide a machine wherein the product is in suspension in the air in the region where the moisture is applied thereto.

A further object of the invention is to provide a machine of the above type wherein the product being treated may be moved continuously through the machine and discharged therefrom in a uniformly moist condition.

A still further object of the invention is to provide a machine of the above type wherein the moisture may be supplied to the moving product at intervals as it travels through the machine.

A still further object of the invention is to provide a machine of the above type wherein there is a variable control for the discharge so that the quantity under treatment may be varied.

A still further object of the invention is to provide a machine of the above type wherein the product in graduated size may be fed to the machine at different points in the path of travel so that the finer particles will be subjected to the moisture treatment for a lesser period of time than the coarser particles.

These and other objects will in part be obvious and will in part be hereinafter more fully disclosed.

In the drawings which show by way of illustration one embodiment of the invention—

Fig. 3 is a vertical sectional view through the machine substantially on the line 3—3 of Fig. 1;

Fig. 4 is a vertical sectional view through the righthand end of the machine as shown in Fig. 1;

Fig. 5 is a detail showing the regulator for controlling the discharge of the product being treated from the upper level to the lower level of travel;

Fig. 6 is a view of the regulator controlling the discharge of the product from the machine;

Fig. 7 is a view in side elevation of one of the arms used for agitating and feeding the product through the machine;

Fig. 8 is an end view thereof, and

Fig. 9 is a plan view of the same.

Figure 1:
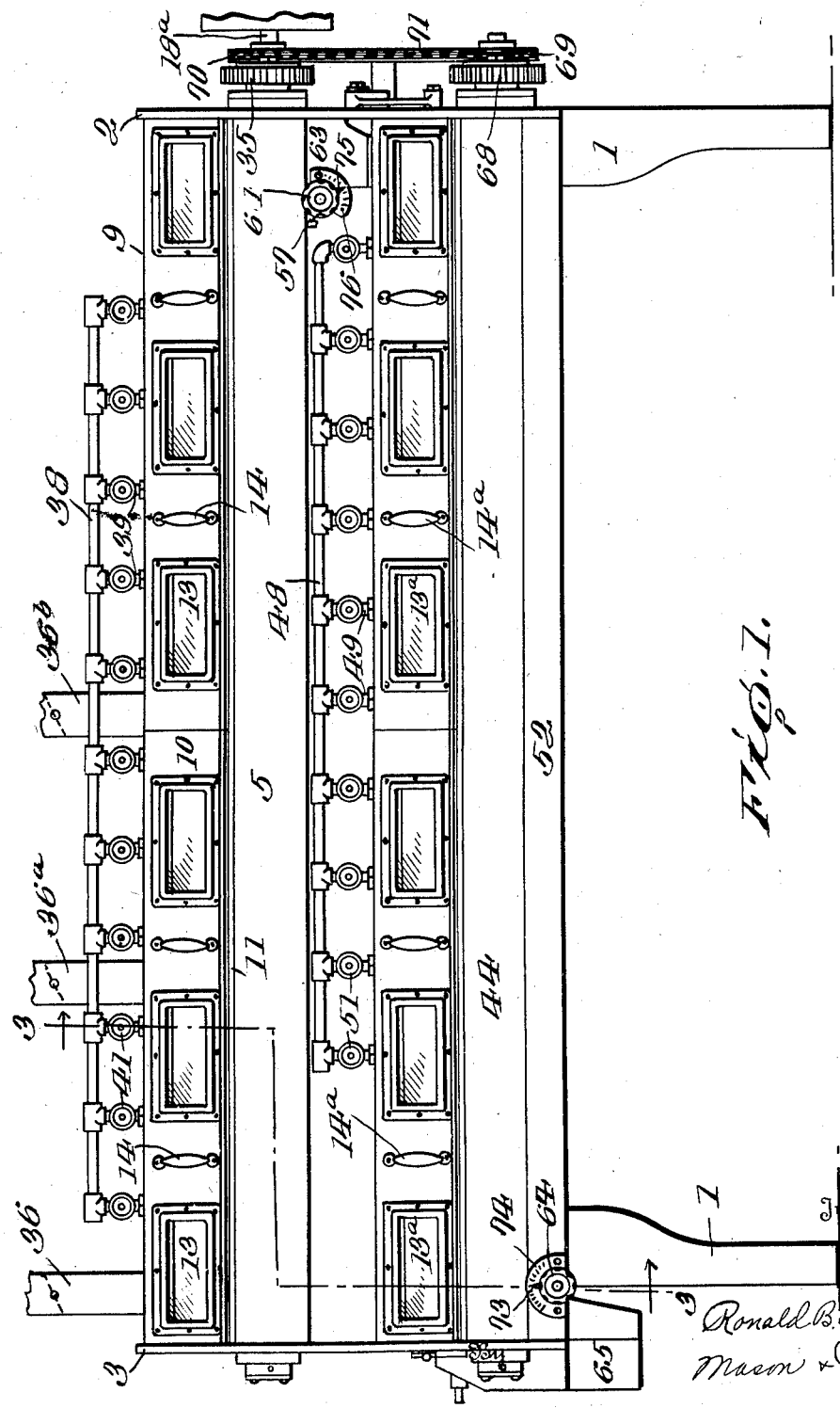
Figure 1 is a side view of the machine embodying the improvements.
Figure 2:
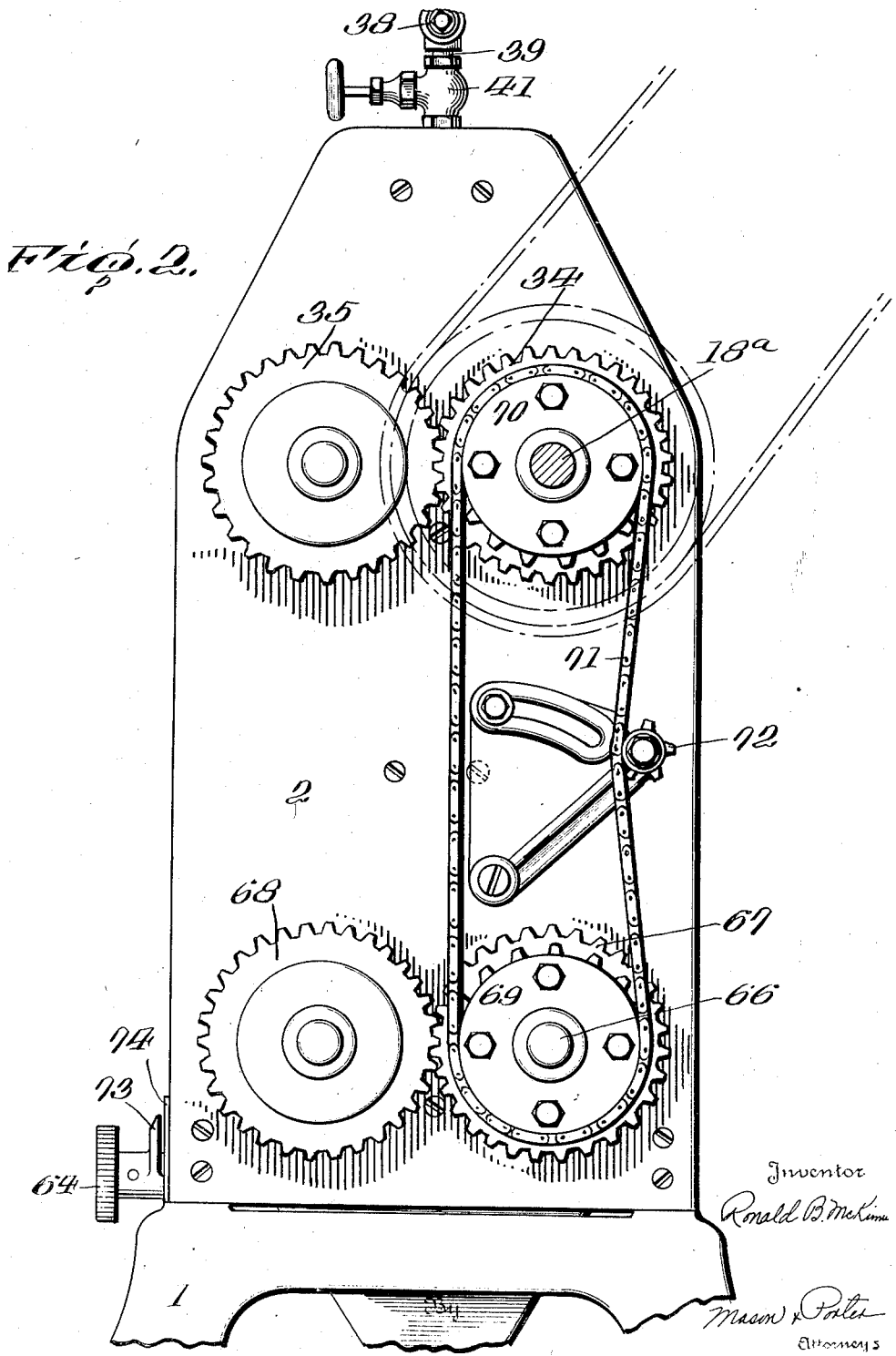
Fig. 2 is an end view from the righthand end of the machine as shown in Fig. 1.

The invention is directed to a machine for moistening products preparatory to the subjecting of the same to mechanical pressure for changing the form or shape of the product. The invention is particularly adapted for the tempering or moistening of ground coffee particles preparatory to reducing the same to the form of thin flakes wherein all of the soluble ingredients are rendered readily accessible to the brewing fluid. In my prior Patent #1,903,362, granted April 4, 1933, I have shown and described a method of reducing coffee particles to thin flakes which includes the step of tempering the coffee particles in order to give firmness to the same when reduced to flake form. The present machine is particularly adapted for this purpose. The machine includes, as shown, a chamber in which is a rotating shaft carrying agitating arms which are so constructed as to feed the product through the chamber simultaneously with the agitating of the product. There are two such shafts in the chamber and they are so disposed and rotated as to throw the coffee particles into a condition of suspension in the air in the region where the coffee particles are initially subjected to moisture. There are a series of jets for supplying the chamber with moisture disposed at intervals along the path of travel of the product. As illustrated, the machine includes two chambers one above the other, and the product is moved along one chamber to the end thereof and then discharged into the chamber therebeneath and is moved along said lower chamber by similar agitating and feeding devices and then finally discharged from the machine. There is means for regulating the discharge of the product from the upper chamber to the lower chamber, and from the lower chamber, so that the quantity of the product under treatment may be varied. There is also shown in the drawings, means whereby the product after being graded as to size may be fed to the machine at different points along the path of travel, so that the coarser particles may be given a longer path of travel and thus subjected for a greater length of time to moisture supplying means while the particles of smaller size are fed at a point where the path of travel is less and the period for moistening the same lessened, and thus it is that both the coarser particles and the finer particles will be provided uniformly with moisture.

Referring more in detail to the drawings, the machine includes a body construction mounted on supporting legs 1, 1. This body construction includes end members 2 and 3. Extending between the end members 2 and 3 are plates 4 and 5 which are curved about centers which are parallel with each other. The plates 4 and 5 terminate at a meeting line 6 which is midway between the sides of the machine. The plate 5 terminates at its upper end at 7, while the plate 4 terminates at 8. There is a top plate 9 extending from end to end of the machine. A cover plate 10 preferably made in sections is so constructed that it rests on a bar 11 secured to the upper end 7 of the plate 5. It also has a removable hinged engagement at 12 with the top plate 9. The top plate has a groove formed therein, and the upper edge of the cover plate 10 is shaped in the form of a hook so that it will engage in this recess, after which it may be swung down so as to rest on and contact with the bar 11. The cover plate 10 is provided with openings which are closed by glass as indicated at 13. Attached to each cover plate are suitable handles 14. At the righthand side of the machine, as viewed in Fig. 3, there is a similar cover plate 10' provided with handles 14' and constructed in the same manner as the cover plate 10. The plates 4 and 5, together with the top plate 9, and these cover plates 10 and 10' form the enclosed chamber 15. The purpose of the cover plates with the glass covered windows is to enable the operator to see the product as it is being treated in different regions along the treating chamber and to readily gain access to the treating chamber, if desired.

Disposed in this chamber 15 is an agitator which is in the form of a tubular shaft as indicated at 18. The tubular shaft is mounted in suitable bearings in the end members 2 and 3. One of these bearings is indicated at 17 in Fig. 4 of the drawings. At the other side of the chamber 15 is a tubular shaft 16 which is mounted in similar bearings in the end members. Each shaft is provided with projecting arms carrying agitating blades or paddles. These arms are all similar in construction and the description and mounting of one will serve for the others. In Figures 7 to 9, inclusive, a detail disclosure is made of the arms and the blades carried thereby. The arm is indicated at 19. At the lower end, the arm is provided with a threaded portion 20. Just above the threaded portion 20 is a circular boss 21. At the outer end of the arm 19 is a blade or paddle 22. A slight distance below the blade 22 is a circular boss 23. The tubular shaft has an opening 24 in one wall thereof, and in the opposite wall there is an opening 25 which is slightly smaller than the opening 24. The arm is inserted through the opening 24 and the threaded portion passes through the opening 25. This brings the circular boss 21 against the inner face of the tubular shaft. The circular boss 23 substantially fits the opening 24, and when a nut 26 is turned on to the threaded portion 20 of the arm, it will firmly clamp the arm to the tubular shaft and thus a very rigid supporting connection between the arm and the shaft is produced. The blade 22 is provided with a flat substantially radial face 27 which is the advance face of the blade in its movement, which is indicated by the arrow in Fig. 8. The outer face of the blade 28 is curved away from a line concentric to the center of rotation of the arm. The lower face 29 is curved so as to intersect the curved face 28 substantially at the point 30 which is on a line intermediate the upper and lower edges of the face 27 of the blade. The purpose of this particular shaping of the blade is to give a streamline shape thereto and prevent vacuum pockets forming at the rear side of the blade. The ends of the blade are rounded off as indicated at 31, 31 in Fig. 9 of the drawings.

The portion 32 of the arm between the tubular shaft and the blade 22 is not circular in cross section, but is given the shape indicated in broken lines in Fig. 9. The forward side of this shank portion is curved on a radius considerably larger than the radius or curvature of the rear side, and this provides slanting side walls 33, 33 which are also streamline in shape so as to prevent the forming of vacuum pockets and thus causing the fine particles to cling and load the arms and blades.

As noted above, the arms are all similar in construction. They are arranged in spiral formation as clearly shown in Fig. 4 of the drawings. If a line is drawn through the center of the arm 19a, the arm 19b, the arm 19c, the arm 19d and the arm 19e, etc., it will form a spiral line around the tubular shaft. Each blade is also set so that its advance face 27 is at an inclination to the plane of rotation of the arm, and this inclination is for the purpose of feeding the product along the chamber as the shaft rotates. As noted above, the shafts 16 and 18 and the arms carried thereby are all similar in construction, the only difference being that the shafts are rotated in the opposite direction as indicated by the arrows in Fig. 3, and the blades are so set that the material is fed toward the same end of the chamber by both rotating shafts.

The shaft 18 extends through its bearing in the end wall 2 and is provided with a pinion 34. The shaft 16 likewise extends through its bearing in the end wall 2 and is provided with a pinion 35 which meshes with the pinion 34. The shaft 18 terminates in a stub shaft 18a and on this shaft is placed a suitable belt wheel or other driving means so that the shaft 18 becomes the actuating shaft for the machine. This rotates the tubular shaft 18, and through the pinions 34 and 35 will impart rotation to the tubular shaft 16.

The product to be treated may be fed into the chamber 15 at the lefthand, as viewed in Fig. 1. A pipe 36 discharges the product into the chamber. The product will pass down into the lower portion of the chamber and will be contacted with by the rotating blades which accomplish two functions. The product will be pushed along by the blades over the curved inner surface of the plates 4 and 5, and will also be moved endwise of the machine due to the inclination of the blades. When the blades leave the upper ends of the plates 4 and 5, the product will be thrown by centrifugal force into the air, and the path of travel of the particles thrown by the agitators at opposite sides will intersect at the center of the chamber. As the particles leave the blades they will be for a short time interval held in suspension in the air, finally falling to the bottom of the chamber where they will be taken up again by the traveling blades and moved about the shafts and again discharged therefrom, but at points so that the particles progress along the length of the chamber and finally reach the discharge end thereof.

Located above the top plate 9 is a pipe 38 which is attached to a suitable water supply. Depending from this pipe 38 are short pipes 39. There are a series of these short pipes and they are all similar in construction and disposed along the length of the chamber 15. At the lower end of each short pipe 39 is a nozzle 40 which is preferably in the form of a spray nozzle and regulated so as to throw a spray or mist of moistening water into the upper portion of the chamber. Also located in the upper portion of the pipe 39 is a suitable valve 41 whereby the amount of moisture furnished each nozzle may be adjusted and varied.

As shown in Fig. 1, there is a supply pipe 36a and a supply pipe 36b which may be used for supplying the product which is to be tempered. It is sometimes desirable to graduate the ground product which is to be tempered so as to separate it into coarser, finer and medium size particles. When such a grading of the product has been made, there are advantages in the feeding of the coarser particles through the supply pipe 36, the medium size particles through the supply pipe 36a and the finely ground particles through the supply pipe 36b. This feeding in of the finer particles at a point nearer the end of the chamber than the coarser particles, causes said particles to be subjected to the tempering process for a shorter length of time, and in this way, the coarser particles may be supplied with a moisture to the same degree or extent as the finer particles, and this greatly aids in the subsequent treatment of the particles when producing flakes by roller pressure, as each particle will have just the right amount of moisture therein to produce a firm flake of a thinness wherein all of the soluble ingredients are readily accessible to the extracting or brewing fluid.

In order that the machine may have sufficient range of time for operating upon the product to uniformly impart moisture thereto to the desired extent, I have shown the machine as having an upper chamber and a lower chamber. The lower chamber is indicated at 42. It is provided with a top plate 43 and with curved bottom plates 44 and 45. Mounted within these curved bottom plates 44 and 45 are tubular shafts 46 and 47, respectively, each of which is provided with arms 19 carrying blades or paddles 22. These arms and the manner of mounting the same are similar to those described above and further description is not thought necessary. The blades or paddles are similarly constructed. The shafts rotate in the direction of the arrow, and the operation of these blades or paddles on the product is precisely the same as that described above in connection with the treatment of the product in the chamber 15, the only distinction being that the blades or paddles are so set that the product is moved from the righthand end of the machine to the lefthand end thereof as viewed in Fig. 1, in this lower chamber. The lower chamber 42 is closed by suitable cover plates 10a provided with windows closed by glass as indicated at 13a. There are also suitable handles 14a for these cover plates. They are mounted in the same manner as the cover plates 10 and 10a. Just above the top plate 43 of the lower chamber is a pipe 48 which is connected to a suitable source of water supply. Depending from this pipe are short pipes 49 similar to the pipes 48. Each pipe is provided with a nozzle 50 and with a control valve 51.

In order to give strength to the framework supporting the end members, the top plate 9 and the intermediate plate 43 are in the form of U-bars, and these U-bars are firmly bolted to the end members. There are also U-bars 52, 52 adjacent the bottom sides of the end members which join the same and form a very strong framework. The legs 1 are secured to these U-bars 52, 52.

When the product reaches the righthand end of the chamber 15 as viewed in Fig. 4, it is discharged through an opening 53 in the plate 5 and through an opening 54 in the plate 4. Attached to the under side of the plate 5 are parallel bars 55, 55 forming guideways for a slide 56 (see Fig. 3). This slide 56 serves to control the opening 53 through the plate 5. There are similar guide bars 55, 55 on the plate 4 and a similar slide 56 which controls the opening 54. Each of these slides is provided with a rack bar 57 on its under face. These rack bars mesh respectively with pinions 58 and 59 carried by a shaft 60. At the outer end of the shaft 60 is a hand grip 61. By turning this hand grip, the pinions can be rotated, and this will move the slides so as to completely close the openings 53 and 54, or set the slides so as to give the desired size of discharge openings from the chamber 15. There is a partition plate 62 against which the product is carried by the rotating blades or paddles, and this stops the movement of the product so that it does not come in contact with the bearings 17 for the tubular shafts. Any coffee product passing the plate 62 will be discharged through an opening 54a into the hopper 63. This insures that the coffee will not contact with the bearings 17.

Immediately beneath the bottom plates 4 and 5 is a hopper 63 which receives the product discharged through the openings 53 and 54, and discharges the product through an opening in the plate 43 so that it drops down into the compartment 42 and on to the agitators and is moved by the agitators underneath the spray nozzle and finally discharged from the lefthand end of the machine, as indicated in Fig. 1. At the lefthand end of the machine there are similar discharge openings controlled by the cross shaft with gears meshing with racks carried by the control slides, and this shaft is operated by a hand grip 64. Inasmuch as these control slides and the manner of operating the same are similar to those described above in connection with the upper chamber 15, it is not thought necessary to illustrate or describe the same more in detail.

The product as it is discharged from this lower chamber 42 passes into a spout 65, and may, from this spout, be discharged on to a suitable conveyor where it is transferred to another apparatus for treatment.

The tubular shaft 47 is attached to a stub shaft 66 (see Fig. 4). This stub shaft carries a pinion 67 which meshes with a pinion 68 carried by the tubular shaft 46. Attached to the pinion 67 is a sprocket wheel 69. Also attached to the pinion 34 is a sprocket wheel 70. Sprocket chains 71 run over these sprockets and transmit motion to the lower tubular shafts. A tightener 72 of the usual type is provided for taking up slack in the sprocket chains.

From the above it will be apparent that a machine has been provided which may be fed continuously with the product to be tempered or moistened, and as the product passes through the machine, it will be uniformly moistened. The product is continuously agitated during its travel through the machine, and as it is thrown by the blades or paddles into the air, it is given a forward feed movement and is also suspended in the region where the moisture is contacting therewith, and this provides a very efficient manner of bringing moisture into contact with all of the particles to be treated. As the particles drop to the bottom of the chamber, they are again picked up by the rotating blades or paddles and again tossed into the region of moisture. Inasmuch as there are nozzles along the path of travel of the product supplying a regulated amount of moisture, the moisture supplied may be regulated at various regions in the travel of the product, and thus just the right amount of moisture content supplied to the particles. If desired, the product to be treated may be graded according to size, and the coarser particles fed in at the front end of the machine, while the medium size particles are fed at another point along the treating chamber, and the finer particles still at another point, and thus the time period for treatment of the finer particles reduced and, as a consequence, the amount of moisture supplied the finer particles regulated so that the moisture is supplied to the particles in proportion to their size, and thus a substantially uniform moisture condition created in all of the particles regardless of the variation in their size. The control slides for the chamber 15 are so set as to retain a quantity of the product in the chamber for treatment. It is preferably set so that the product therein extends well up to the center line of the tubular shaft, but the supply should not be so great that the blades or paddles do not pass out of the supply. The blades or paddles must pass out of the bulk of the supply and lift it so as to throw it by centrifugal force across the region where moisture is supplied thereto.

Associated with the hand grip 64 is a pointer 73. This pointer moves over a scale 74 which is graduated so as to indicate the size of the opening, that is, whether it is one-quarter open, one-half open, or any other fractional portion of opening for a given set position of the hand grip. Likewise, associated with the hand grip 61 is a pointer 75 and a graduated plate 76 which indicates the extent of opening of the slides controlling the final discharge of the product.

While the invention is described as specifically applied to the tempering of coffee particles preparatory to the reducing of the same to flake form, it will be understood that it may be used in connection with the tempering of any products which are to be flaked for extraction purposes, such as spices, tea leaves, drugs, and any other products. It is obvious that many changes in the details of construction and the arrangement of the parts may be made without departing from the spirit of the invention as set forth in the appended claims.

Having thus described the invention, what I claim as new and desire to secure by Letters Patent, is—

1. A machine for moistening products preparatory to crushing the same including a moistening chamber, means for supplying the same with moisture, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, the curved surfaces terminating at the adjacent sides in tangential extensions intersecting on a line located adjacent a horizontal plane containing the axes of the agitators, said agitators being disposed so as to move close to the curved surfaces whereby the product to be moistened is carried along said curved surfaces and thrown free of the agitators in paths intersecting substantially at the center of the moistening chamber.

2. A machine for moistening products preparatory to crushing the same including a moistening chamber, means for supplying the same with moisture, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, the curved surfaces terminating at the adjacent sides in tangential extensions intersecting on a line located adjacent the horizontal plane of the axes of rotation of the agitators, and extending above said horizontal plane at the sides remote from each other, said agitators being disposed so as to move close to the curved surfaces whereby the product to be moistened is carried along said curved surfaces and thrown free of the agitators in paths intersecting substantially at the center of the moistening chamber.

3. A machine for moistening products preparatory to crushing the same including a moistening chamber, means for supplying the same with moisture, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, the curved surfaces terminating at the adjacent sides in tangential extensions intersecting on a line located adjacent a horizontal plane containing the axes of the agitators, said agitators being disposed so as to move close to the curved surfaces whereby the product to be moistened is carried along said curved surfaces and thrown free of the agitators in paths intersecting substantially at the center of the moistening chamber, means for delivering the product to be moistened into said chamber at one end thereof, and means for discharging the same from the chamber at the other end thereof, said agitators being constructed so as to move the material along said chamber while applying moisture thereto.

4. A machine for moistening products preparatory to crushing the same including a moistening chamber, means for supplying the same with moisture, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, the curved surfaces terminating at the adjacent sides in tangential extensions intersecting on a line located adjacent the horizontal plane of the axes of rotation of the agitators and extending above said horizontal plane at the sides remote from each other, said agitators being disposed so as to move close to the curved surfaces whereby the product to be moistened is carried along said curved surfaces and thrown free of the agitators in paths intersecting substantially at the center of the moistening chamber, means for delivering the product to be moistened into said chamber at one end thereof, and means for discharging the same from the chamber at the other end thereof, said agitators being constructed so as to move the material along said chamber while applying moisture thereto.

5. A machine for moistening products preparatory to crushing the same including a moistening chamber, means for supplying the same with moisture, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, the curved surfaces terminating at the adjacent sides in tangential extensions intersecting on a line located adjacent a horizontal plane containing the axes of the agitators, said agitators being disposed so as to move close to the curved surfaces whereby the product to be moistened is carried along said curved surfaces and thrown free of the agitators in paths intersecting substantially at the center of the moistening chamber, means for delivering the product to be moistened into said chamber at one end thereof, and means for discharging the same from the chamber at the other end thereof, said agitators being constructed so as to move the material along said chamber while moisture is being applied thereto, said discharge means including a control valve whereby the rate of discharge of the product from the chamber may be varied.

6. A machine for moistening products preparatory to crushing the same including a moistening chamber, means for supplying the same with moisture, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, the curved surfaces terminating at the adjacent sides in tangential extensions intersecting on a line located adjacent a horizontal plane containing the axes of the agitators, said agitators being disposed so as to move close to the curved surfaces whereby the product to be moistened is carried along said curved surfaces and thrown free of the agitators in paths intersecting substantially at the center of the moistening chamber, means disposed at spaced intervals along the chamber for feeding the product to be moistened into the chamber and means for discharging the product from one end of said chamber, said last-named means including a control valve whereby the rate of discharge may be varied.

7. A machine for moistening products preparatory to crushing the same including a moistening chamber, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, the curved surfaces terminating at the adjacent sides in tangential extensions intersecting on a line located adjacent a horizontal plane containing the axes of the agitators, said agitators being disposed so as to move close to the curved surfaces whereby the product is carried along said curved surfaces and thrown free of the agitators in paths intersecting substantially at the center of the moistening chamber, and moisture supplying nozzles located in the upper portion of the chamber for supplying moisture to the product.

8. A machine for moistening products preparatory to crushing the same including a moistening chamber, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, the curved surfaces terminating at the adjacent sides in tangential extensions intersecting on a line located adjacent a horizontal plane containing the axes of the agitators, said agitators being disposed so as to move close to the curved surfaces whereby the product is carried along said curved surfaces and thrown free of the agitators in paths intersecting substantially at the center of the moistening chamber, and moisture supplying nozzles located in the upper portion of the chamber for supplying moisture to the product, means for feeding said product into said chamber at one end thereof, and means for discharging the product from the other end of said chamber including a control valve whereby the rate of discharge may be varied, said agitators being constructed so as to feed the product from the receiving end of the chamber to the discharge end thereof.

9. A machine for moistening products preparatory to crushing the same including a moistening chamber, means for supplying the same with moisture, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, the curved surfaces terminating at the adjacent sides in tangential extensions intersecting on a line located adjacent a horizontal plane containing the axes of the agitators, said agitators being disposed so as to move close to the curved surfaces whereby the product to be moistened is carried along said curved surfaces and thrown free of the agitators in paths intersecting substantially at the center of the moistening chamber, each agitator including a shaft, radial arms carried thereby, and agitating blades mounted at the outer ends of said arms.

10. A machine for moistening products preparatory to crushing the same including a moistening chamber, means for supplying the same with moisture, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, the curved surfaces terminating at the adjacent sides in tangential extensions intersecting on a line located adjacent a horizontal plane containing the axes of the agitators, said agitators being disposed so as to move close to the curved surfaces whereby the product to be moistened is carried along said curved surfaces and thrown free of the agitators in paths intersecting substantially at the center of the moistening chamber, each agitator including a shaft, radial arms carried thereby, and agitating blades mounted at the outer ends of said arms and extending at right angles to the arms, said arms being disposed in a spiral line circumscribing the shaft on which they are mounted and each blade being disposed in a plane substantially at right angles to the spiral line whereby the product is conveyed from one end of the chamber to the other as it is agitated.

11. A machine for moistening products preparatory to crushing the same including a moistening chamber, means for supplying the same with moisture, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, said agitators being disposed so as to move close to the curved surfaces whereby the product to be moistened is carried along said curved surfaces and thrown free of the agitators in paths intersecting substantially at the center of the moistening chamber, each agitator including a shaft, radial arms carried thereby, a blade at the outer end of each arm, said arms being disposed in a spiral line circumscribing the shaft, each blade having a substantially flat portion lying in a plane at right angles to the spiral line, and curved top and bottom portions intersecting at a point in rear of the face of the blade so as to provide streamlines and prevent the formation of vacuum pockets in rear of the blade.

12. A machine for moistening products preparatory to crushing the same including a moistening chamber, means for supplying the same with moisture, agitators located in said chamber and rotating in opposite directions in paths spaced from each other, said agitators having an upward movement at the sides remote from each other, the axes of said agitators being parallel and disposed in the same horizontal plane, said chamber having the bottom portion thereof beneath each agitator curved about the axis of rotation of the agitator with which it is associated, said agitators being disposed so as to move close to the curved surfaces whereby the product to be moistened is carried along said curved surfaces and thrown free of the agitators in paths intersecting substantially at the center of the moistening chamber, each agitator including a shaft, radial arms carried thereby, a blade at the outer end of each arm, said arms being disposed in a spiral line circumscribing the shaft, each blade having a substantially flat portion lying in a plane at right angles to the spiral line, and curved top and bottom portions intersecting at a point in rear of the face of the blade so as to provide streamlines and prevent the formation of vacuum pockets in rear of the blade, each arm having the forward face thereof curved about a smaller radius with the side faces of the arm inclining rearwardly toward each other so as to prevent the formation of vacuum pockets on the arms during the rotation thereof.

13. A machine for moistening ground coffee preparatory to crushing and flaking the same including in combination, a chamber, agitators located in said chamber and rotating in opposite directions in paths spaced from each other, said agitators having an upward movement at the sides remote from each other, the axes of said agitators being parallel and disposed in the same horizontal plane, said chamber having the wall thereof beneath and at the outer side of each agitator curved to conform to the path of rotation of the agitator with which it is associated, the curved surfaces terminating at the adjacent sides in tangential extensions intersecting on a line located adjacent a horizontal plane containing the axes of the agitators, each agitator including a series of arms, blades carried thereby disposed so as to move close to the curved surfaces whereby the ground coffee is carried along said curved surfaces and thrown free of the agitators in paths intersecting substantially at the center of the moistening chamber, and a series of moisture supplying nozzles located in said chamber directly above the intersecting paths for supplying moisture to the coffee.

14. A machine for moistening ground coffee preparatory to crushing and flaking the same including in combination, a chamber, agitators located in said chamber and rotating in opposite directions in paths spaced from each other, said agitators having an upward movement at the sides remote from each other, the axes of said agitators being parallel and disposed in the same horizontal plane, said chamber having the wall thereof beneath and at the outer side of each agitator curved to conform to the path of rotation of the agitator with which it is associated, the curved surfaces terminating at the adjacent sides in tangential extensions intersecting on a line located adjacent a horizontal plane containing the axes of the agitators, each agitator including a series of arms, blades carried thereby disposed so as to move close to the curved surfaces whereby the ground coffee is carried along said curved surfaces and thrown free of the agitators in paths intersecting substantially at the center of the moistening chamber, a series of moisture supplying nozzles located in said chamber directly above the intersecting paths for supplying moisture to the coffee, means for feeding the ground coffee into said chamber at one end thereof, and means for discharging the ground coffee from the other end of said chamber, said last-named means including a control valve for regulating the rate of discharge of the ground coffee, said blades being disposed so as to feed the ground coffee from one end of the chamber to the other as it is agitated.

RONALD B. McKINNIS.